United States Patent
Nagashima

(10) Patent No.: US 6,182,524 B1
(45) Date of Patent: Feb. 6, 2001

(54) HAND LEVER APPARATUS

(75) Inventor: Akira Nagashima, Kanagawa (JP)

(73) Assignee: Kioritz Corporation, Tokyo (JP)

( * ) Notice: Under 35 U.S.C. 154(b), the term of this patent shall be extended for 0 days.

(21) Appl. No.: 08/898,434

(22) Filed: Jul. 22, 1997

(30) Foreign Application Priority Data

Jul. 22, 1996 (JP) .................................................. 8-192574

(51) Int. Cl.[7] .............................. F16C 1/12; G05G 11/00
(52) U.S. Cl. ...................... 74/501.6; 74/502.2; 74/506; 74/488; 74/489; 123/400
(58) Field of Search ................................. 74/501.6, 489, 74/427, 426, 512, 471 R, 488; 200/61.86; 30/382; 123/400, 397, 398, 182.1, 339.13

(56) References Cited

U.S. PATENT DOCUMENTS

| 3,683,716 | * | 8/1972 | Anderson | 74/491 |
| 4,191,065 | * | 3/1980 | Golobay et al. | 74/489 |
| 4,245,713 | * | 1/1981 | Mochida et al. | 180/176 |
| 4,302,880 | * | 12/1981 | Elfving et al. | 30/382 |
| 4,528,954 | * | 7/1985 | Slattery | 123/413 |
| 5,365,802 | * | 11/1994 | Suzuki et al. | 74/482 |
| 5,515,748 | * | 5/1996 | Yagi | 74/625 |
| 5,664,543 | * | 9/1997 | Taomo et al. | 123/400 |
| 5,758,546 | * | 6/1998 | Taomo et al. | 74/501.6 |

FOREIGN PATENT DOCUMENTS

| 15926 | * | 5/1956 | (DE) | 74/489 |
| 57-19944 | | 4/1982 | (JP) . | |

* cited by examiner

Primary Examiner—Vinh T. Luong
Assistant Examiner—C. Williams
(74) Attorney, Agent, or Firm—Pillsbury Madison & Sutro LLP; Intellectual Property Group

(57) ABSTRACT

A hand lever apparatus is mountable on a working machine for controlling operation of the working machine. The hand lever apparatus includes a main lever and a magnitude-magnifying mechanism. The magnitude-magnifying mechanism includes a pivot pin, a lever member pivotal about the pivot pin, a pulley, and a connecting cable. The lever member has a shorter arm portion and a longer arm portion, which opposes the shorter arm portion and is operatively connected to a throttle cable of a throttle valve of the working machine. The shorter arm portion is operatively connected to the main lever via the connecting cable so that actuation of the finger-manipulable portion pivots the lever member about the pivot pin and causes the longer arm portion to pull the throttle cable away from the throttle valve and open the throttle valve of the working machine from a minimum-opening idling state. The hand lever apparatus also includes a position-adjust mechanism cooperatively associated with the pulley to cause translational movement of the pulley axis to control the speed of a driven member of the working machine.

15 Claims, 12 Drawing Sheets

HAND LEVER APPARATUS

BACKGROUND OF THE INVENTION

This invention relates to a hand lever apparatus for manipulating through cable means various driven members such as a throttle valve of an internal combustion engine, and in particular to a hand lever apparatus which is adapted to be mounted in the vicinity of grip portion of a handle in a portable working machine such as a hedge trimmer or a bush cutter and which is suited for manipulating the opening and closing of the throttle valve by means of a throttle cable.

In a portable working machine such as a hedge trimmer or a bush cutter, a hand lever apparatus for adjusting the opening degree of a throttle valve of an internal combustion engine is attached to a portion of a U-shaped handle or a bar handle which is in the vicinity of grip portion of these handles for controlling the output of the internal combustion engine by hand.

This hand lever apparatus is usually provided with a throttle trigger (a throttle lever) that can be manipulated with fingers of an operator, so that the opening degree of the throttle valve can be adjusted by turning this throttle lever. The throttle valve is usually biased in the direction of minimum opening degree (idling opening degree) so that the throttle valve is retained at this idling opening degree in a free condition. However, when the throttle cable is pulled beyond a predetermined distance thus losing a predetermined looseness, the opening of the throttle valve is shifted from the idling opening degree to a high speed revolution side.

As for the construction of the handle lever apparatus for adjusting the opening degree of the throttle valve as explained above, there are known two types, i.e. an idling opening degree automatic reset type wherein the throttle lever can be automatically returned together with the throttle valve to the original position (idling opening degree) when the throttle lever is released from the state of revolution manipulation; and an opening degree-fixed type wherein the throttle lever can be kept immobilized at a desired revolution manipulation position even if fingers are released from the throttle lever (see Japanese Utility Model Publication S/57-19944).

According to the handle lever apparatus of idling opening degree automatic reset type, the engine can be automatically returned to the idling condition whenever the throttle lever is released from the operating fingers, so that if the portable working machine is of the type where the rotational driving force of the engine is transmitted via a centrifugal clutch to a working portion such as a cutting blade, the centrifugal clutch is turned into a cut-off condition thus preventing the rotational driving force from reaching the working portion. Therefore, if any accident happens to occur, the movement of the working portion can be immediately stopped by immediately rendering the throttle valve to return to the idling opening degree, which is an advantage in terms of enhancing the operational safety. However, there are problems in this handle lever apparatus of idling opening degree automatic reset type that the throttle lever is required to be held always with fingers so as to keep the throttle lever at a desired revolution position, thus making it cumbersome in operating the throttle lever at an intermediate opening degree, thus giving a fatigue to the operating fingers, and making it difficult to keep the magnitude of manipulation (revolution speed) constant.

When easiness of use is taken into account, it is generally desired that the revolution manipulation lever that will be manipulated with fingers such as a throttle lever should be constructed such that it takes only two positions, i.e. a released position and a set position (grasping position) without requiring to take an intermediate opening degree. In other words, it is considered preferable in view of manipulability that the adjustment of the throttle valve to an intermediate opening (a partial opening) and to a full opening (WOT) should be effected by setting the throttle lever to the same revolution manipulation position (the set position).

On the other hand, a hand lever apparatus of the aforementioned opening degree-fixing type is free from the aforementioned problems accompanied with the handle lever apparatus of idling opening degree automatic reset type, i.e. the throttle lever can be kept in an immobilized state at a desired revolution manipulation position even if fingers are released from the throttle lever, thus allowing the fingers to become free so as to easily perform the working. In spite of these advantages however, if any accident happens to occur, the throttle lever position-retaining function of the hand lever apparatus is required to be canceled by way of a separate manipulation, i.e. it is impossible to immediately stop the movement of the working member, thus rendering the hand lever apparatus of opening degree-fixing type inferior in terms of safety as compared with the hand lever apparatus of idling opening degree automatic reset type.

In any of the idling opening degree automatic reset type or the opening degree-fixing type, it is required to readjust the revolution manipulation position of the throttle valve if the throttle valve is to be returned to the previous opening degree in resuming the work after the throttle lever is once left free for temporarily suspending the work (this kind of manipulation is frequently experienced in the case of the bush cutter). However, this readjustment operation is troublesome so that there is still left room for improvement in terms of manipulability.

With a view to overcome the aforementioned problems or to solve the subject matter involved in the conventional hand lever apparatus, the present assignee has proposed as set forth in Japanese patent application H/7-108340 a hand lever apparatus, which is provided with a main lever and a sub-lever both being adapted to be rotationally manipulated. According to this hand lever apparatus, the cable connected to a driven member is adapted to be pulled by the sub-lever through a turning member such as a movable pulley, and the turning member is adapted to be shifted by the main lever.

According to this hand lever apparatus, the opening degree of the throttle valve constituting a driven member can be adjusted by way of the cable and at the same time easily retained at a desired opening degree. Additionally, this hand lever apparatus is advantageous in that it is possible to immediately put the throttle valve back to the minimum opening degree (the idling opening degree) whereby assuring a high safety, that it is possible to avoid fingers from being tired in short time, and that it is possible to dispense with the readjustment of opening degree of the throttle valve when the throttle valve is desired to be set to the previous opening degree which has been set in advance before the throttle valve is returned to the idling opening degree.

However, since the length of a cable to be pulled by the main lever corresponds with the rotational angle of the main lever of the hand lever apparatus, a relatively large rotational manipulation angle of the main lever is required for pulling a sufficient length of the cable, thus making the hand lever apparatus disadvantageous in this respect. In order to assure this large rotational manipulation angle of the main lever, a relatively large space for allowing the rotation of the main lever is required between the grip portion of the handle and the main lever, resulting in an enlargement in size and an increase in weight of the apparatus. In particular, when the main lever protrudes outward from the handle to a large extent, the main lever frequently becomes an obstacle at the time of use or even at the time of non-use, whereby deteriorating the workability and manipulability of the hand lever apparatus.

BRIEF SUMMARY OF THE INVENTION

The present invention has been made under the circumstances mentioned above, and therefore an object of the present invention is to provide a hand lever apparatus which is capable of adjusting the opening degree of the throttle valve constituting a driven member by making use of a cable, capable of easily retaining the throttle valve at a desired opening degree, capable of immediately putting the throttle valve back to the minimum opening degree (idling opening degree) whereby assuring a high degree of safety, capable of avoiding fingers from being tired in short time, capable of dispensing with the readjustment of opening degree of the throttle valve when the throttle valve is desired to be set back to the previous opening degree which has been set in advance before the throttle valve is returned to the idling opening degree, capable of minimizing the size and lightening the weight of the apparatus, and capable of improving the workability and manipulability of the apparatus.

With a view to realize the aforementioned objects, the hand lever apparatus according to the present invention is featured in that it is fundamentally provided with a main lever which is adapted to be rotationally manipulated so as to pull a cable connected to a driven member, and with a pulling magnitude-magnifying mechanism for magnifying a pulling magnitude of the cable by the main lever, the pulling magnitude-magnifying mechanism being interposed between the main lever and the cable.

According to a preferred embodiment of the present invention, the hand lever apparatus is additionally provided with a position-adjustment mechanism wherein the main lever is adapted to be manipulated to pull the cable connected to the driven member through a turning member and the turning member is adapted to be shifted to and retained at a desired position.

As for an example of the pulling magnitude-magnifying mechanism, one employing a lever or a gear may be used.

As a preferable example of the position-adjustment mechanism, one provided with a sub-lever adapted to be rotationally manipulated and with a turning member which is attached to a position which is dislocated from the rotational axis of a sub-lever may be employed. In this case, the sub-lever should preferably be mounted in such a manner that it can be retained in an immobilized state at a desired operating position.

As a typical but non-limitative use of the hand lever apparatus according to this invention, it may be employed for adjusting the opening degree of a throttle valve of an internal combustion engine. As a preferable specific example of such use, the following embodiment may be mentioned.

Namely, there is proposed a hand lever apparatus which is disposed near the grip portion of a handle in a working machine wherein the aforementioned throttle valve is usually energized in the direction of idling opening degree and when a throttle cable is pulled beyond a predetermined extent thus losing a predetermined looseness, the throttle valve begins to open from the idling opening degree so as to render an internal combustion engine provided with the throttle valve to actuate a working member such as a cutting blade. This hand lever apparatus is featured in that the throttle cable is adapted to be pulled through the aforementioned pulling magnitude-magnifying mechanism and the aforementioned turning member by the main lever thereby losing a predetermined looseness, and at the same time the turning member is forcibly shifted in the direction of pulling the throttle cable by the position-adjustment mechanism, thereby adjusting the opening degree of the throttle valve.

According to a preferable embodiment of the hand lever according to this invention, when the main lever is rotationally moved up to a set position which is close to the grip portion of the handle, the throttle cable is pulled by the pulling magnitude-magnifying mechanism employing a lever for instance as well as through the turning member comprising a pulley for instance to a predetermined extent, thereby to lose the aforementioned looseness.

In this case, the magnitude of pulling (the magnitude of displacement) of the cable by the main lever can be enlarged by the pulling magnitude-magnifying mechanism, so that the rotational angle of the main lever that is required for pulling the cable at a predetermined required distance can be minimized as compared with that required in the conventional hand lever apparatus. Accordingly, the space for allowing the main lever to rotate between the grip portion of the handle and the main lever can be minimized, resulting in a miniaturization and lightening of the apparatus and hence the workability and operability of the hand lever apparatus can be improved.

When a manipulation member mounted on the position-adjustment mechanism such as a sub-lever is moved to a desired position while keeping the main lever maintained at the aforementioned set position, the turning member is forced to move in the throttle cable-pulling direction, and hence the throttle cable is further pulled via the pulling magnitude-magnifying mechanism and the turning member, thus moving the throttle valve from the minimum opening degree (the idling opening degree) to a desired opening degree thereby to adjust the opening degree.

In this case, since the throttle cable is pulled by the turning member while being wound around the turning member, the throttle cable will be pulled twice as much distance as that of the moving distance of the turning member (which is the same as the increase in magnitude of displacement by a movable pulley). As a result, the magnitude for manipulating the position-adjustment mechanism which is required for adjusting the opening degree of the throttle valve, i.e. the moving distance of the turning member can be minimized, thus further enhancing the miniaturization and lightening of the apparatus.

In this case, even if the manipulation member such as the sub-lever is left free, the manipulation member can be kept as it is in an immobilized state at the previous manipulation position due to the effect by a position-holding means attached to the manipulation member, so that the pre-adjusted opening degree (the set opening degree) of the throttle valve can be maintained. Because of this, a burden on the fingers can be reduced.

When any accident happens to occur at the occasion where the opening degree of the throttle valve is set at a desired degree so as to necessitate a prompt and drastic reduction of revolutional speed of the engine, the main lever is released thereby allowing the main lever to be pulled in the reverse direction to return together with the pulling magnitude-magnifying mechanism to the original positions, since the throttle cable is always energized in a direction to close the throttle valve. As a result, the throttle cable is returned to the manipulation-free state, and the throttle valve is allowed to return to the idling opening degree, thus rendering the engine to take an idling state.

In this case, when this hand lever apparatus is applied to a working machine whose rotational driving force is adapted to be transmitted via a centrifugal clutch to a working member such as a cutting blade, the centrifugal clutch is turned into a cut-off condition, thus cutting the transmission of driving force to the working member thereby making it possible to immediately stopped the movement of the working member such as a cutting blade.

When the main lever is rotated again up to the set position close to the grip portion after the main lever is once released as mentioned above, the looseness of the throttle cable becomes zero and, since the sub-lever provided with the position-adjustment mechanism is kept remained in the previous operational position, the throttle valve is put back to the previous opening degree which has been set before the main lever is released, thus making the re-adjustment of the sub-lever unnecessary.

As explained above, according to the hand lever apparatus of the present invention, the opening degree of the throttle valve constituting a driven member can be controlled by means of a cable and at the same time easily retained at a desired opening degree. Additionally, the throttle valve can be immediately put back to the minimum opening degree (the idling opening degree) thus ensuring a high operational safety, and at the same time it is possible to avoid the fingers from becoming tired in short time. Furthermore, when the throttle valve is desired to be put back to the previous opening degree which has been set before the throttle valve is turned into the idling opening degree, it can be achieved without requiring the re-adjustment of the sub-lever. Moreover, according to the hand lever apparatus of the present invention, it is possible to effectively miniaturize and lighten the apparatus, and hence the workability and operability of the hand lever apparatus can be further improved.

DETAILED DESCRIPTION OF THE INVENTION

The present invention will be further explained with reference to the drawings depicting various embodiments of this invention.

Figure 1:
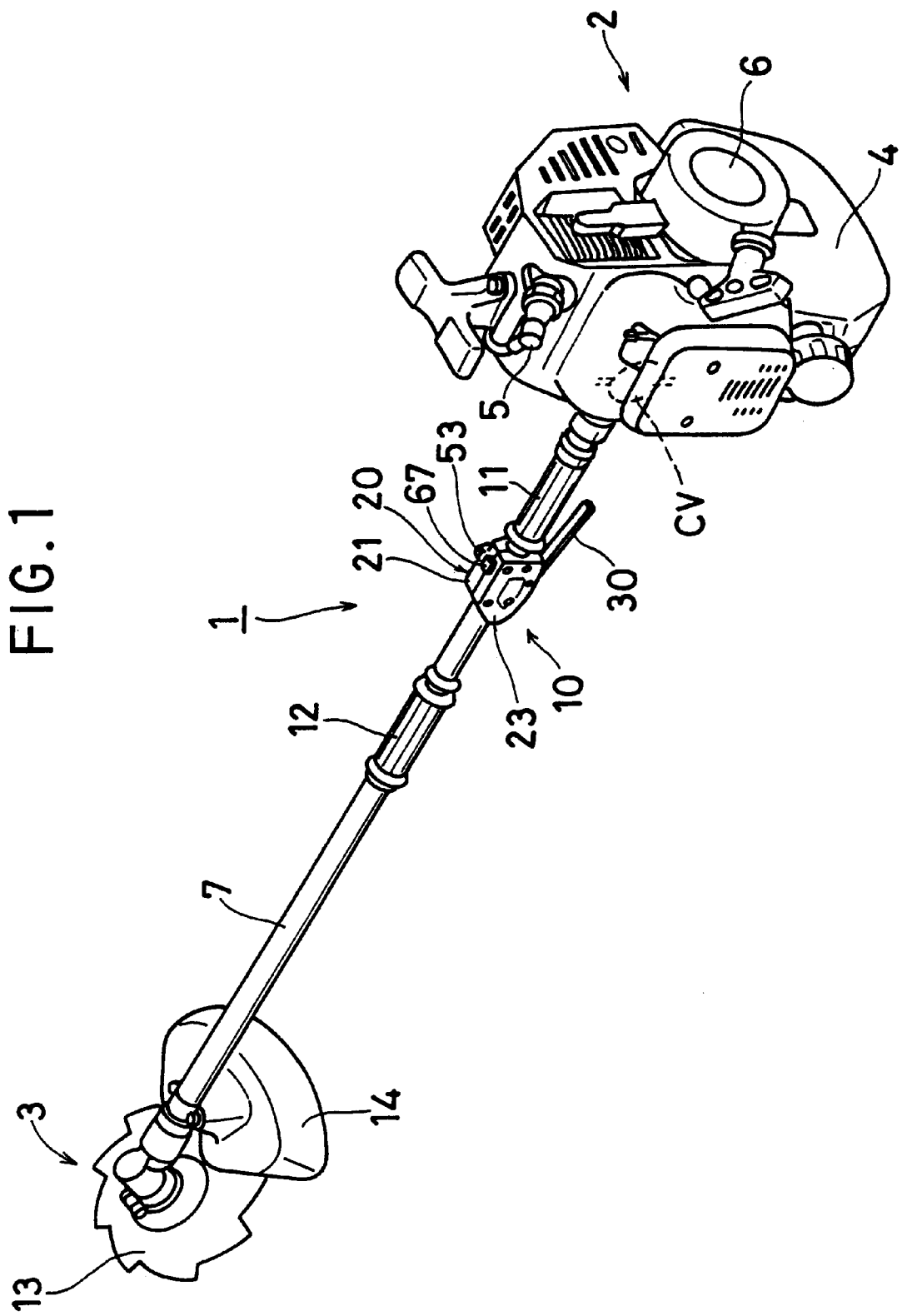
FIG. 1 is a perspective view showing one example of a bush cutter which is provided with one embodiment of the hand lever apparatus according to the present invention.

FIG. 1 shows one example of a bush cutter which is provided with one embodiment of the hand lever apparatus according to the present invention. This bush cutter 1 shown in FIG. 1 comprises a cylindrical bar handle 7 provided with a pair of grip portions 11 and 12 which are spaced apart from each other by a predetermined distance; an operation portion 3 comprising a cutting blade 13 and a safety cover 14 which are mounted on the distal end portion of the bar handle 7; and an internal combustion engine (a small air-cooled two-cycle gasoline engine) 2 mounted on the proximal end portion of the bar handle 7 and functioning as a power source for driving the cutting blade 13 by way of a drive shaft (not shown) coaxially inserted in the bar handle 7. This internal combustion engine 2 is accompanied with a recoil starter 6 and a fuel tank 4, and provided with a carburetor (not shown) having a throttle valve CV and also with an ignition plug 5.

In this embodiment, the throttle valve CV is usually energized in the direction of the minimum opening (idle opening) so that when a throttle (inner) cable 17 (see FIG. 5) which is connected to the throttle valve CV and will be explained hereinafter is pulled beyond a predetermined distance from the non-operation state, the looseness is taken away and the throttle valve CV begins to open from the minimum opening degree.

For the purpose of adjusting the opening degree of the throttle valve CV, a hand lever apparatus 10 according to this embodiment is attached to a portion of the bar handle 7 which is adjacent to the rear grip portion 11 (rather than the fore grip portion 12) and adapted to be grasped usually by the right hand.

Figure 2:
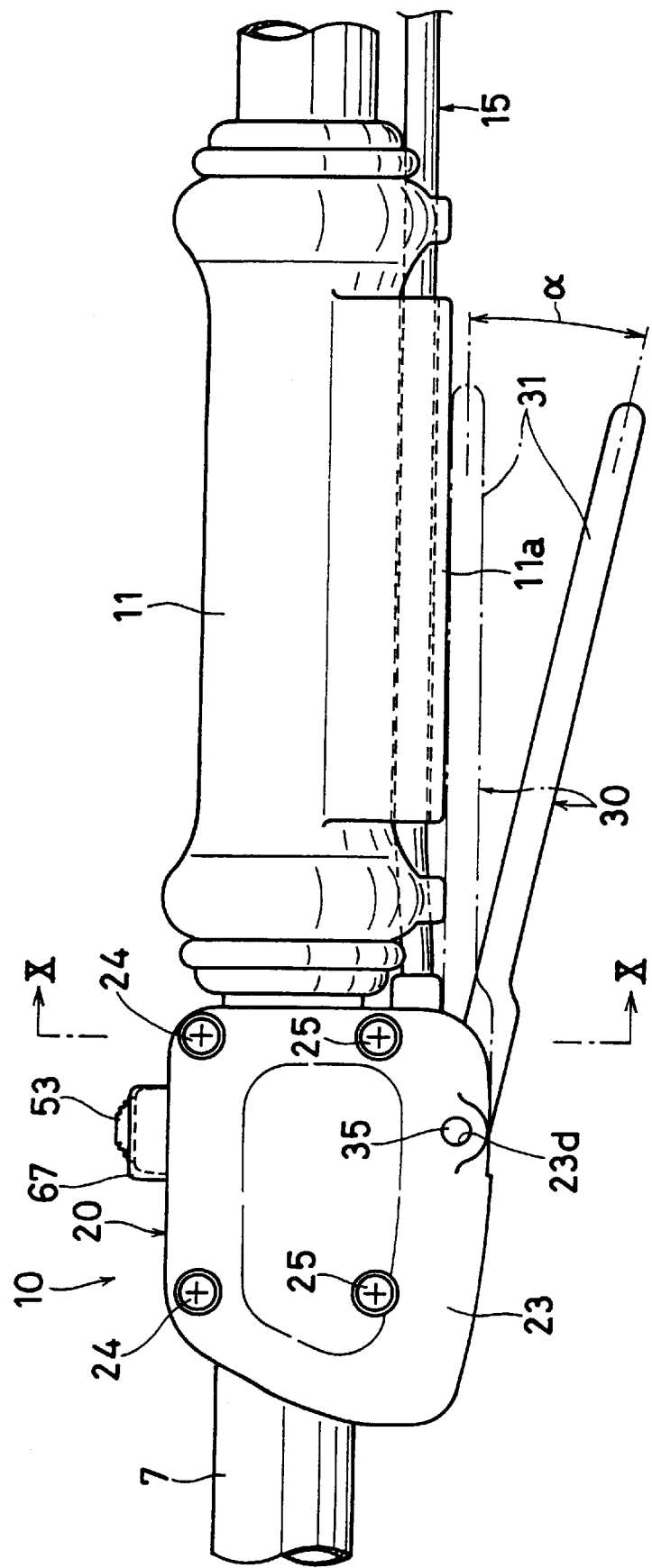
FIG. 2 is a left side view illustrating one embodiment of the hand lever apparatus according to the present invention.
Figure 3:
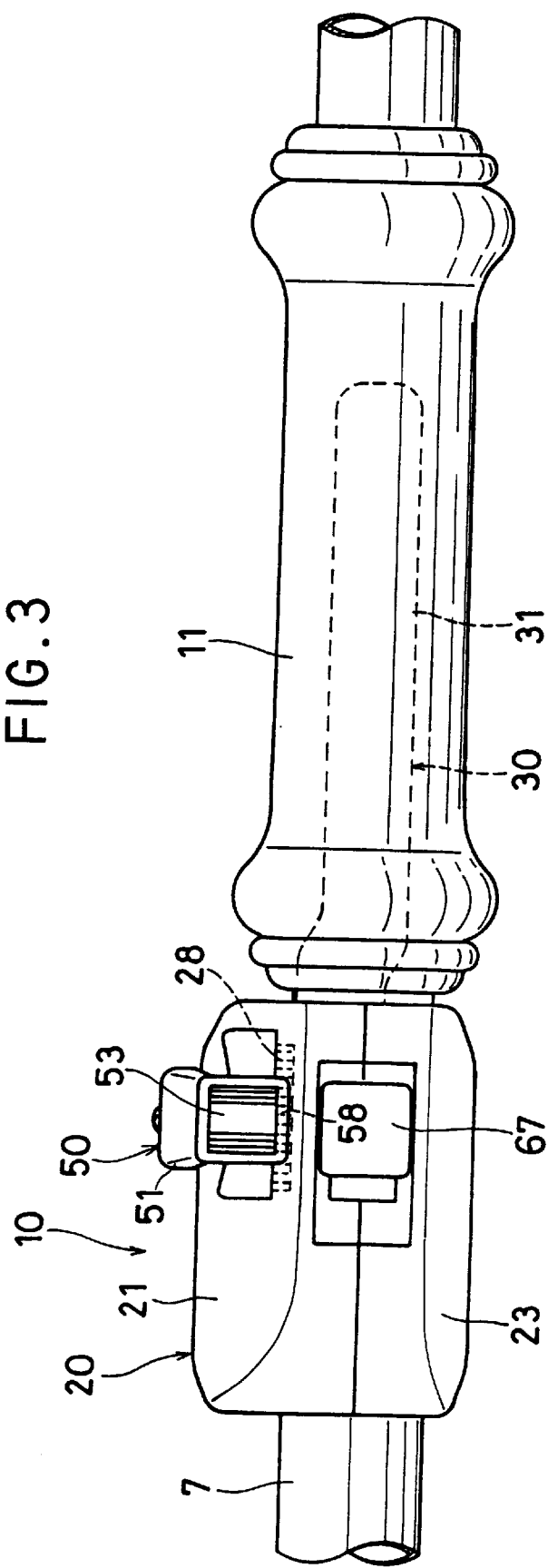
FIG. 3 is a plan view illustrating one embodiment of the hand lever apparatus according to the present invention.
Figure 4:
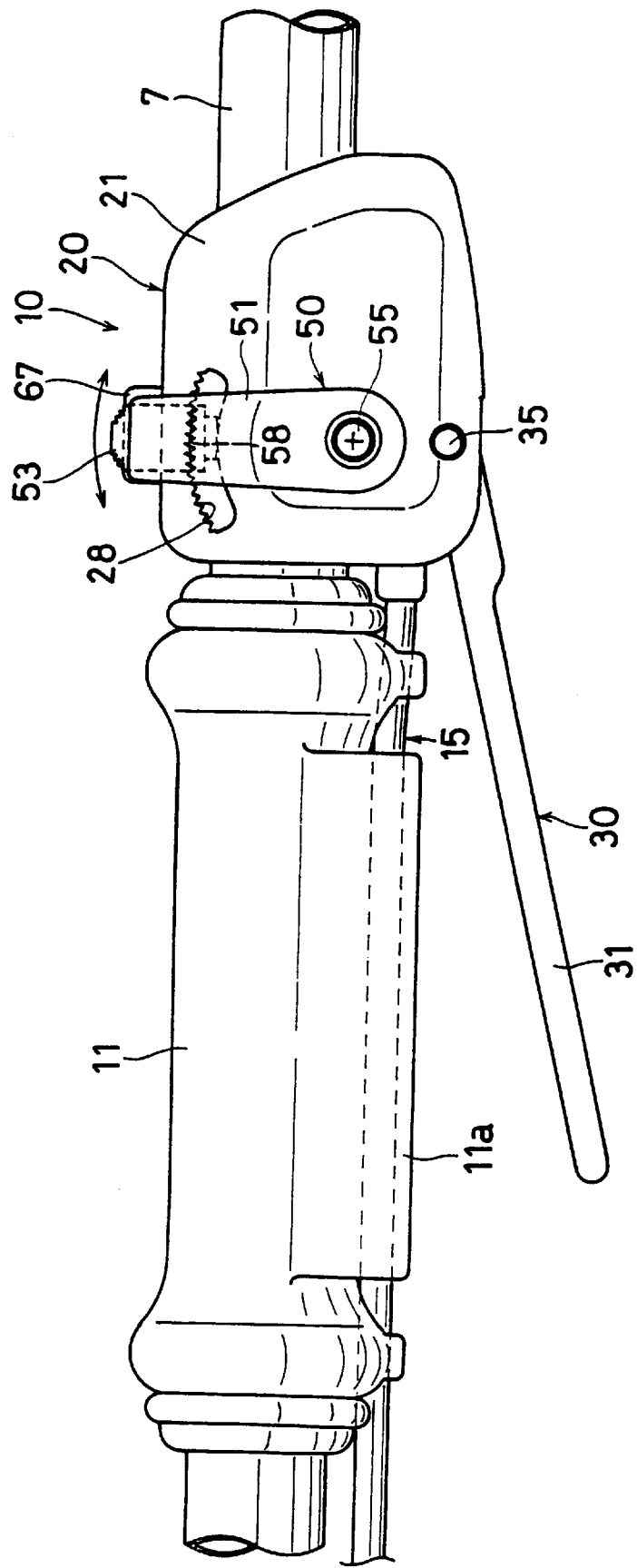
FIG. 4 is a right side view illustrating one embodiment of the hand lever apparatus according to the present invention.

As shown in FIGS. 2 to 4, the hand lever apparatus 10 comprises a case 20 which is externally fitted over and in close to the rear grip portion 11 of the bar handle 7, and a main lever 30 which is pivotally attached to the case 20 for pulling the throttle cable 17 inserted in an outer tube 16 of a Bowden cable 15 which is connected to the throttle valve CV.

Figure 6:
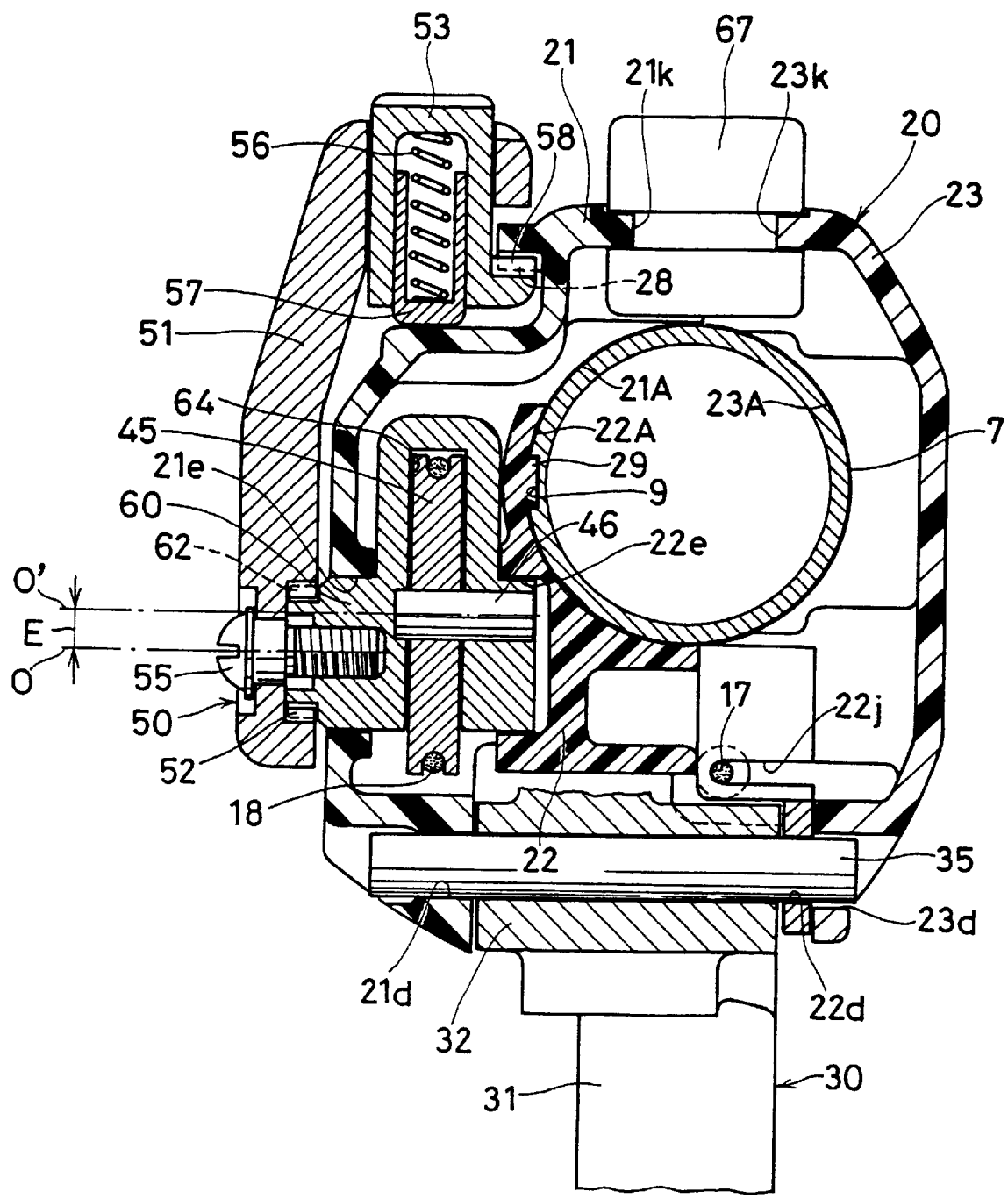
FIG. 6 is a sectional view taken along the line VI—VI of FIG. 5.
Figure 7:
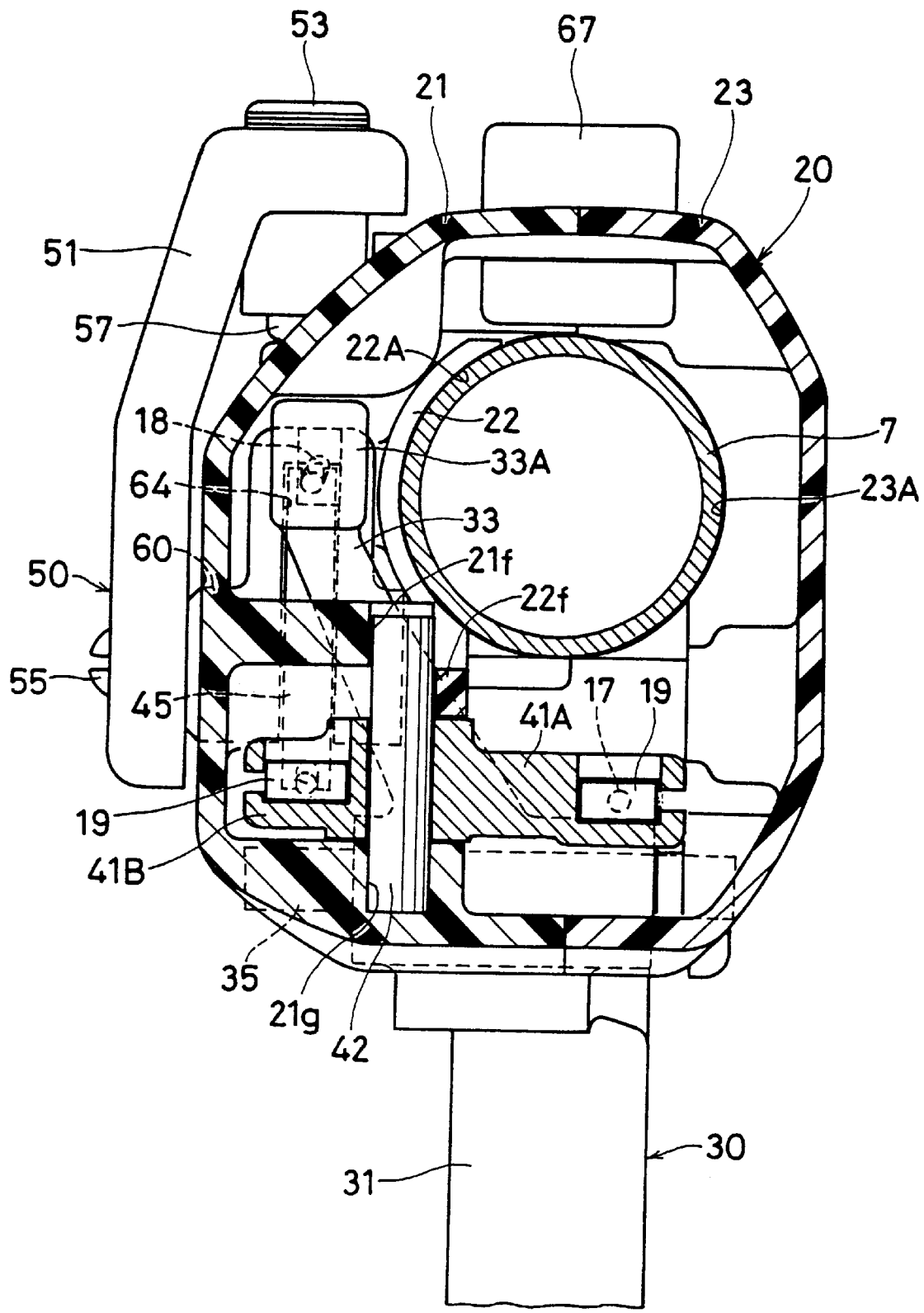
FIG. 7 is a sectional view taken along the line VII—VII of FIG. 5.

As clearly shown in FIGS. 6 and 7, the case 20 is formed of a three-block construction consisting of a right cover case 21, an intermediate cover case 22 and a left cover case 23, all being made of a plastic material.

Figure 10:
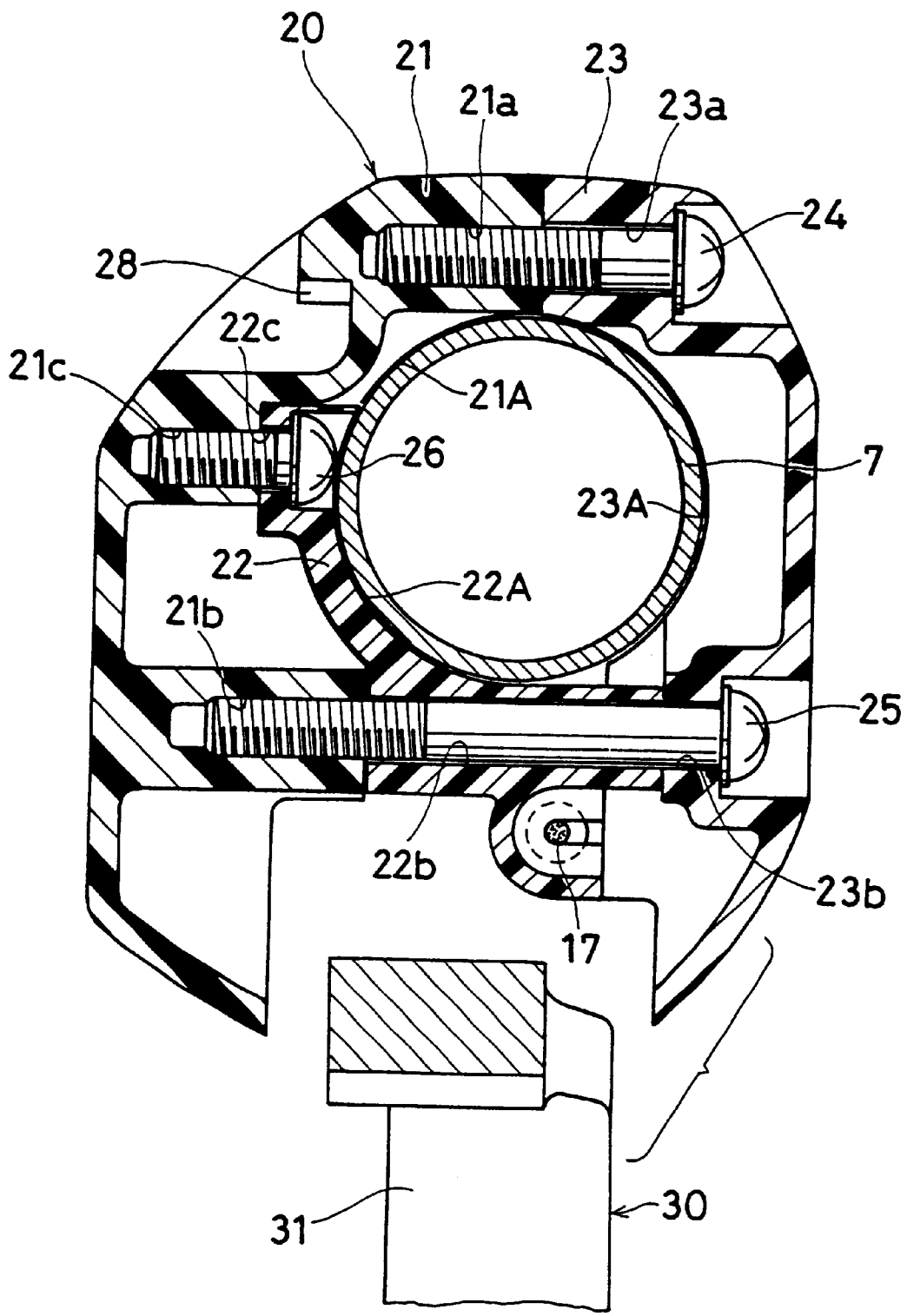
FIG. 10 is an enlarged sectional view taken along the line X—X of FIG. 2.

As clearly shown in FIG. 2 and FIG. 10 showing an enlarged sectional view taken along the line X—X of FIG. 2, the right cover case 21 and the left cover case 23 each having a rectangular tray-like shape in outer appearance are provided, at four portions thereof i.e. upper two portions and lower two portions, with tapped holes 21*a* and 21*b* and insertion holes 23*a* and 23*b*. A screw 24 is screwed in each of the tapped holes 21*a* and insertion holes 23*a* which are disposed at the upper portion, and a screw 25 is screwed in each of the tapped holes 21b and insertion holes 23b which are disposed at the lower portion.

The right cover case 21 and the left cover case 23 are fastened with the intermediate cover case 22 being interposed therebetween in such a manner that the contacting surfaces 21A and 22A of the fore and rear end portions thereof each having a semi-circular cross-section are contacted with the outer peripheral surface of the bar handle 7 so as to hold the bar handle 7 therebetween.

Figure 5:
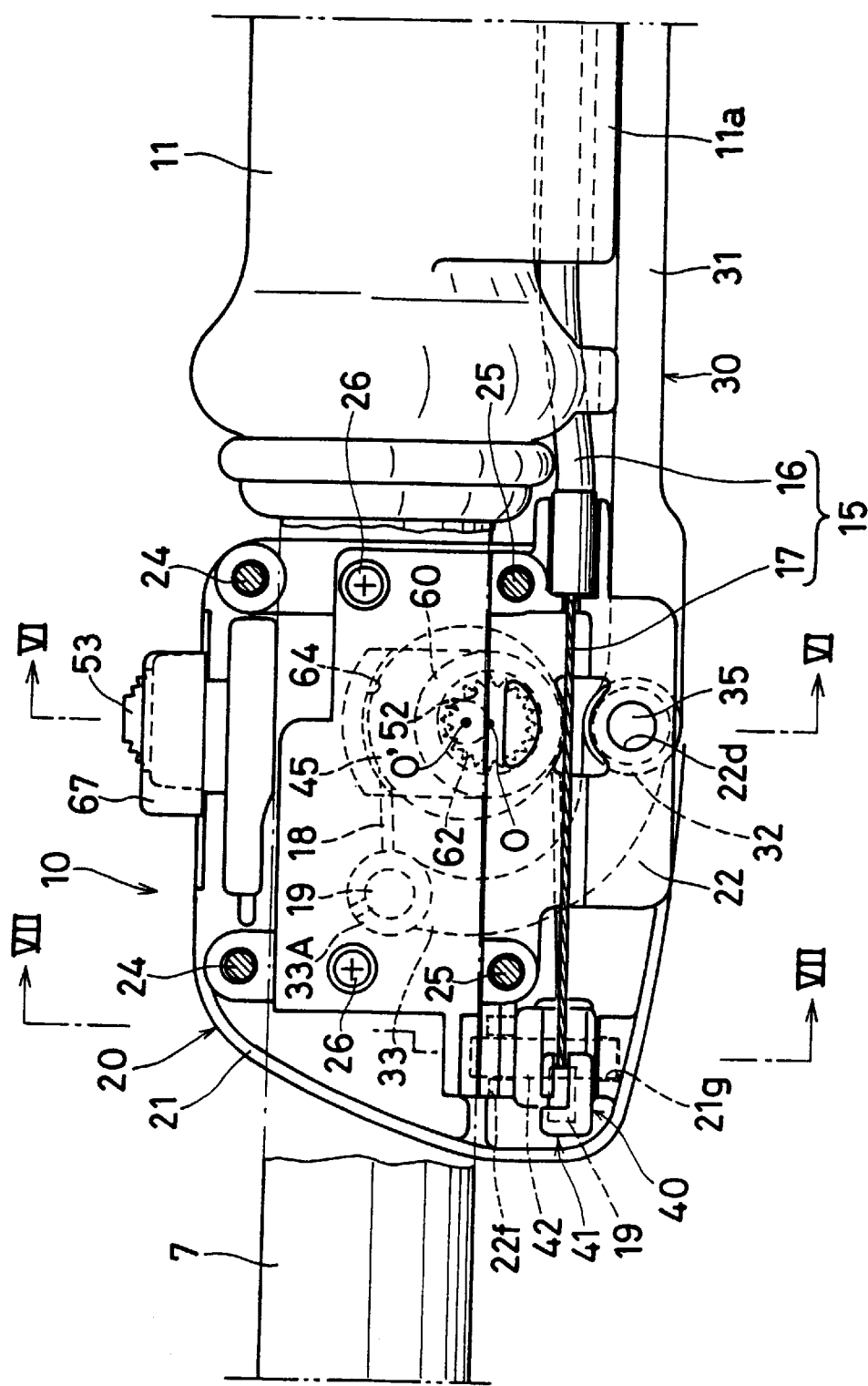
FIG. 5 is a partially sectioned enlarged left side view illustrating a state where a left side cover case of the hand lever apparatus shown in FIG. 2 is dismantled.
Figure 9:
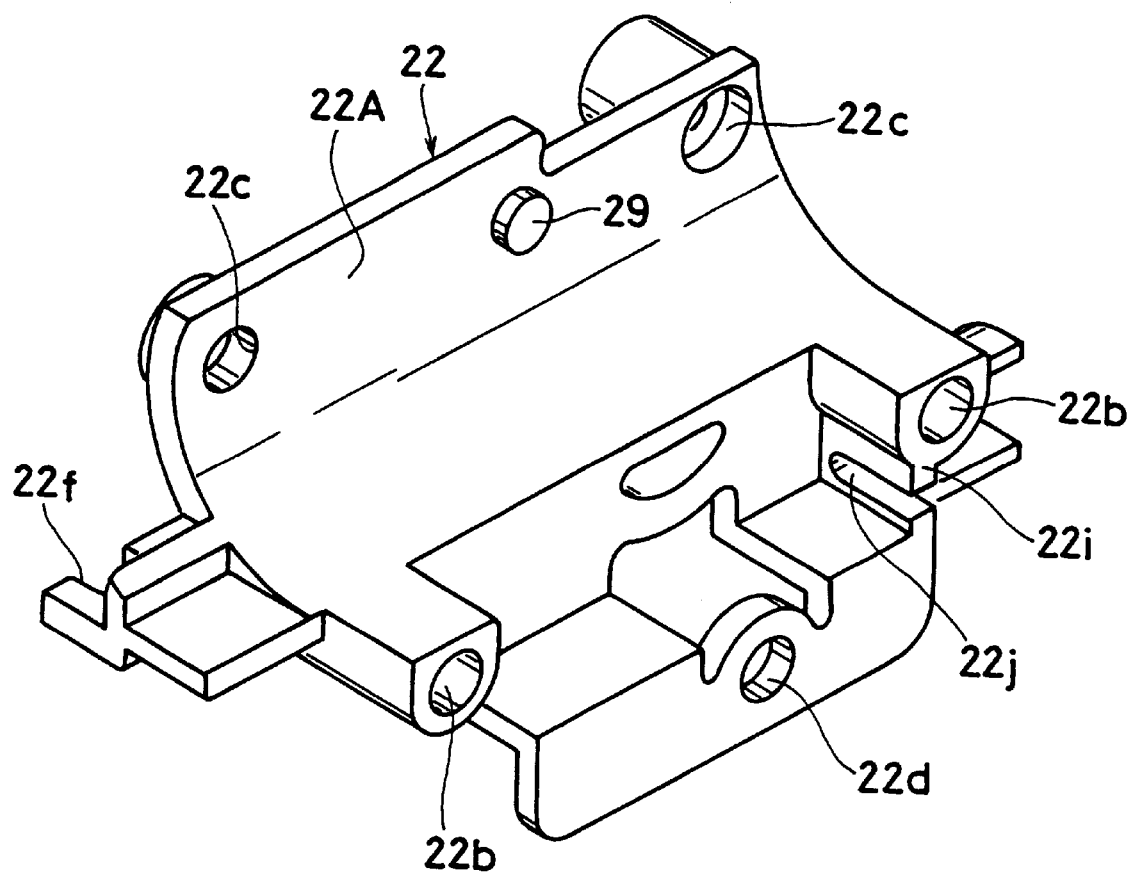
FIG. 9 is a perspective view showing an intermediate cover case of the hand lever apparatus shown in FIG. 2.

As clearly shown in FIG. 10, FIG. 5 where the left side cover case 23 is dismantled and FIG. 9 illustrating the single body of the intermediate cover case 22, the intermediate cover case 22 which is interposed between the right cover case 21 and the left cover case 23 is provided with insertion holes 22b which are coaxially interposed between the lower tapped holes 21b and the lower insertion holes 23b so as to allow the screw 25 to be inserted therethrough. In addition to that, the intermediate cover case 22 is provided with a contacting surface 22A having a semi-circular cross-section which is adapted to be contacted with the lower right portion of the outer periphery of the bar handle 7, and with insertion holes 22c in the vicinity of upper fore and rear end portions of the contacting surface 22A, which are adapted to be inserted by a fastening screw 26 to be screwed in tapped holes 21c formed in the vicinity of central fore and rear end portions of the right cover case 21, so that the intermediate cover case 22 can be firmly attached to the right cover case 21 by means of the screws 26.

The contacting surface 22A of the intermediate cover case 22 is provided with a locking protrusion 29 which is adapted to be engaged with a circular concave 9 (i.e. not a through-hole) formed in the vicinity of the center portion of the right outer peripheral surface of the cylindrical handle 7 (see FIG. 6).

As clearly seen from FIGS. 5 to 8, the main lever 30 which is rotatably attached to the case 20 comprises a straight manipulation portion 31 which is adapted to be rotated by the fingers so as to come close to a lever receiver 11a formed on the lower end portion of the rear grip portion 11, a cylindrical portion 32 loosely fitted over a supporting shaft 35, and a curved portion 33 linked via the proximal end portion thereof to the cylindrical portion 32 and being slightly twisted slantwise in a rightward and upward direction. The right end portion of the supporting shaft 35 is press-fitted in an insertion hole 21d which is formed in the vicinity of the lower corner portion of the rear end of the right cover case 21, while the left end portion of the supporting shaft 35 is press-fitted in an insertion hole 22d formed in the intermediate cover case 22 and at the same time loosely inserted in an insertion hole 23d formed in the left cover case 23 (see FIG. 6).

In this structure, the throttle cable 17 is adapted to be pulled by the main lever 30 constructed as mentioned above via a pulling magnitude-magnifying mechanism 40 and a pulley 45 constituting a turning member.

Figure 8:
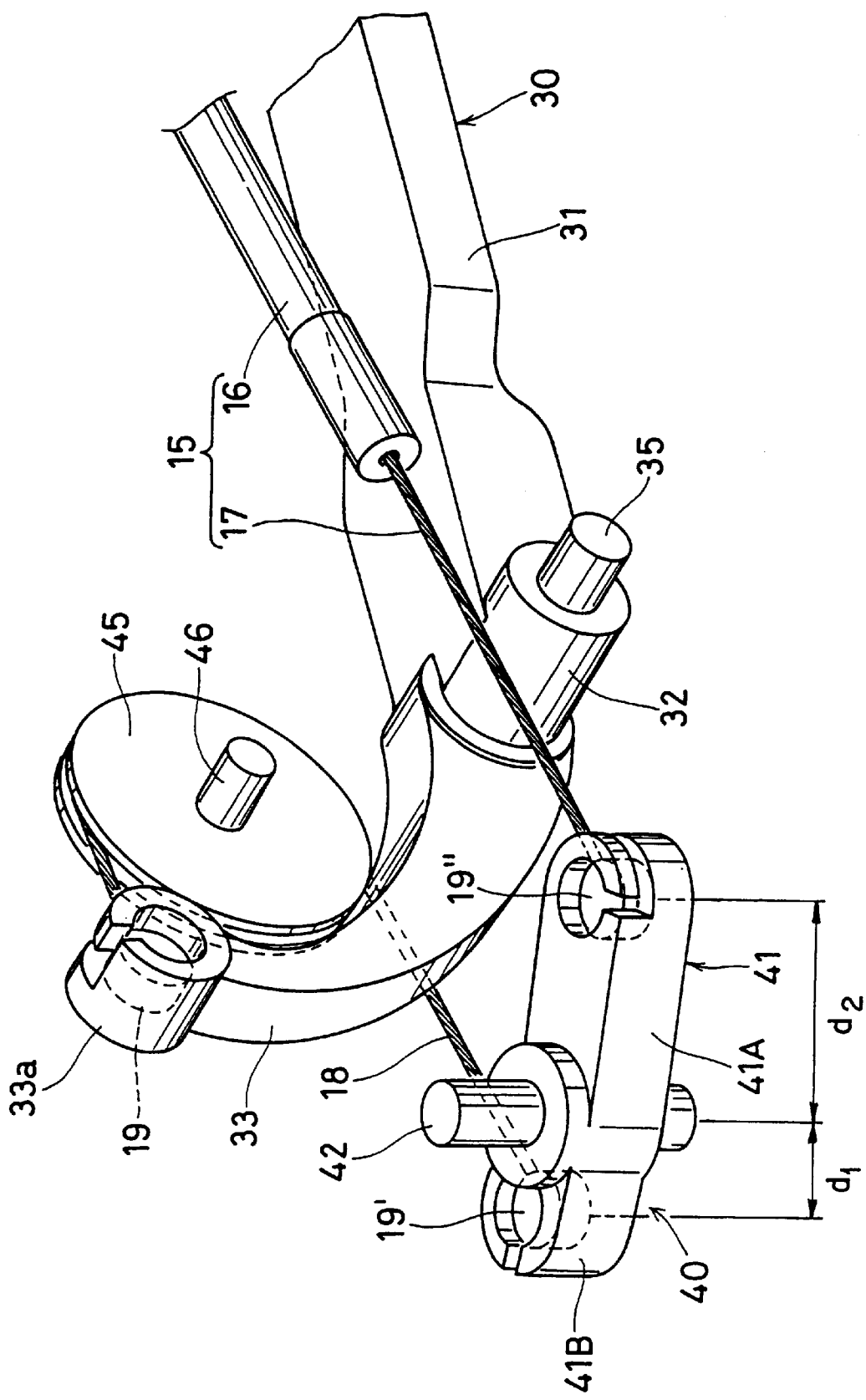
FIG. 8 is a schematic perspective view showing the pulling magnitude-magnifying mechanism of the hand lever apparatus shown in FIG. 2 together with the relevant portion thereof.

As clearly seen from FIGS. 7 and 8, the pulling magnitude-magnifying mechanism 40 comprises a lever 41 which is rotatably fitted over a supporting shaft 42 whose both end portions are held by a bearing hole 21g formed at the lower forward portion of the right cover case 21, by an axis-supporting portion 21f provided near the central portion of the right cover case 21 and by an axis-supporting portion 22f formed on the intermediate cover case 22. Thus, as shown in FIG. 8, the terminal metal fitting 19" of the throttle cable 17 attaches to the longer arm portion (or second arm portion) 41A at a second-arm-portion connection position which, although not numbered, corresponds to the position of the terminal metal fitting 19" of the throttle cable 17. A second distance $d_2$ separates the supporting shaft 42 from the second-arm-portion connection position. A terminal metal fitting 19 attached to the distal end portion of the throttle cable 17 is fitted in the distal end portion (left end portion) of a longer arm portion 41A of the lever 41.

By the way, the distal end portion of the outer tube 16 of the Bowden cable 15 in which the throttle cable 17 is inserted is fastened at a fastening portion 22i formed on the intermediate cover case 22, and the throttle cable 17 is extended from a slit 22j formed at the fore end portion of the fastening portion 22i (see FIG. 9) toward the longer arm portion 41A of the lever 41 and linked thereto as mentioned above.

A cable 18 is wound around a pulley 45 constituting a turning member so that the running direction of the cable 18 is reversed by the pulley 45, and both end portions of the cable 18 are attached respectively with a metal fitting 19' or 19", one of which being connected to the distal end portion (right side portion) of the shorter arm portion 41B of the lever 41, the other being connected to the cylindrical distal end portion 33a of the curved portion 33 of the main lever 30. Thus, the terminal metal fitting 19' of the cable 18 attaches to the shorter arm portion (or first arm portion) 41B at a first-arm-portion connection position which, although not numbered, corresponds to the position of the terminal metal fitting 19' of the cable 18. A first distance $d_1$ separates the supporting shaft 42 from the first-arm-portion connection position. As seen from FIG. 8, the first distance $d_1$ of the shorter arm portion 41B is smaller than the second distance $d_2$ of the longer arm portion 41A.

As clearly seen from FIG. 8, when the main lever 30 (or the manipulating portion 31 thereof) having the structure as mentioned above is manipulated to rotate in the direction to come close to the rear grip portion 11, the shorter arm portion 41B of the lever 41 is pulled backward by means of the cable 18 thereby causing the lever 41 to rotate clockwise direction (in the plan view), and hence the throttle cable 17 is drawn out forward by way of the longer arm portion 41A of the lever 41. In this case, due to the lever ratio of the lever 41, the pulling distance of the throttle cable 17 by the main lever is magnified.

According to this embodiment, a position-adjustment mechanism 50 is provided for forcibly shifting the pulley 45 in the direction of pulling the throttle cable 17 (the rearward direction) so as to retain the pulley 45 at a desired position in an immobilized state.

As clearly seen from FIGS. 4 to 7, this position-adjustment mechanism 50 comprises a rotatable axis 60 provided with a housing portion 64 for housing the pulley 45, and a sub-lever 51 provided with a serration 52 to be engaged with a serrated shaft 62 disposed on the right end portion of the rotatable axis 60 and secured by means of screw 55 to the right end portion of the rotatable axis 60.

The left end portion of the rotatable axis 60 is axially supported by a bearing portion 22e disposed on the right side of the intermediate cover case 22, while the right end portion of the rotatable axis 60 is axially supported by a bearing portion 21e formed in the right cover case 21. The pulley 45 disposed inside the housing portion 64 is rotatably mounted on a pin 46. In this case, the central axial line O' of the pin 46 supporting the pulley 45 is offset upward by a predetermined distance of E from the rotation axis O of the sub-lever 51 (the central axial line of the rotational axis 60), so that when the sub-lever 51 is allowed to rotate in the rearward direction, the pulley 45 is caused to move in the direction of pulling the throttle cable 17 (or in the rearward direction).

A cylindrical push button 53 having an opened bottom is fitted in the upper portion of the sub-lever 51 in such a manner that it can be slid upward and downward. In this push button 53 is slide-fitted a bottomed sleeve 57 which is normally biased by a coil spring 56 in the downward direction and mounted in such a manner that the bottom portion of the bottomed sleeve 57 is downwardly protruded so as to contact with and slidable in the forward or rearward direction on the right shoulder portion of the right cover case 21.

A serrated movable gear 58 is disposed facing upward at the lower left end portion of the push button 53. On the other hand, as clearly shown in FIGS. 3 and 4, a serrated fixed gear 28 engaging with the serrated movable gear 58 is disposed at the upper portion of the right cover case 21 in such a manner that the serrated fixed gear 28 depicts a circular arc facing downward and extending in the forward and rearward direction with the center of curvature being at the rotation axis line O of the sub-lever 51.

When the push button 53 is pressed in the structure of this position-adjustment mechanism 50, the serrated movable gear 58 is disengaged from the serrated fixed gear 28, so that when the push button 53 is pulled to a desired rearward position while keeping the pressing of the push button 53, the sub-lever 51 is caused to swing rearward, and at the same time the pulley 45 is caused to move in the direction of pulling the throttle cable 17 (the rearward direction). When the pressing of the push button 53 is released under this condition, the serrated movable gear 58 is caused to engaged with the serrated fixed gear 28 again, and the states of the sub-lever 51 and the pulley 45 are kept remained at that rotational manipulation position.

A slide type stop switch 67 for short-circuiting the passage of electric current to the ignition plug 5 of the internal combustion engine 2 so as to stop the engine 2 is mounted in such a manner as to be interposed between rectangular cut portions 21k and 23k, which are formed at the upper central portions of the right cover case 21 and the left cover case 23 respectively (see FIG. 6).

The attachment of the hand lever apparatus 10 constructed according to this embodiment to the bar handle 7 can be performed as follows. Namely, first of all, the movable members such as the main lever 30, the pulling magnitude-magnifying mechanism 40, the pulley 45, the position-adjustment mechanism 50, etc. are assembled and housed by making use of the right cover case 21 and the intermediate cover case 22, and at the same time the intermediate cover case 22 is fastened onto the right cover case 21 by making use of a couple of screws 26 (see FIGS. 5, 10 and 11).

Then, the assembled body comprising the mobile members such as the main lever 30, the pulling magnitude-magnifying mechanism 40, the pulley 45, the position-adjustment mechanism 50, etc. which are housed in the right cover case 21 and the intermediate cover case 22 is attached to the bar handle 7 in such a manner that the bar handle 7 is sandwiched between and enclosed by this assembled body and the left cover case 23. In this case, the positioning of the assembled body to the bar handle 7 can be performed by fitting the locking protrusion 29 formed on the intermediate cover case 22 in the concave portion 9 formed in the bar handle 7 (see FIG. 11). Thereafter, all of the right cover case 21, the intermediate cover case 22 and the left cover case 23 are fastened together by making use of four pieces of bolts 24 and 25.

As a result, the case member 20 constituted by the right cover case 21, the intermediate cover case 22 and the left cover case 23 is externally fitted over a predetermined position of the bar handle 7.

The dismantling of the hand lever apparatus 10 of this embodiment from the bar handle 7 can be performed by disassembling the left cover case 23 from the right cover case 21 and from the intermediate cover case 22 which has been assembled with the right cover case 21.

Figure 11:
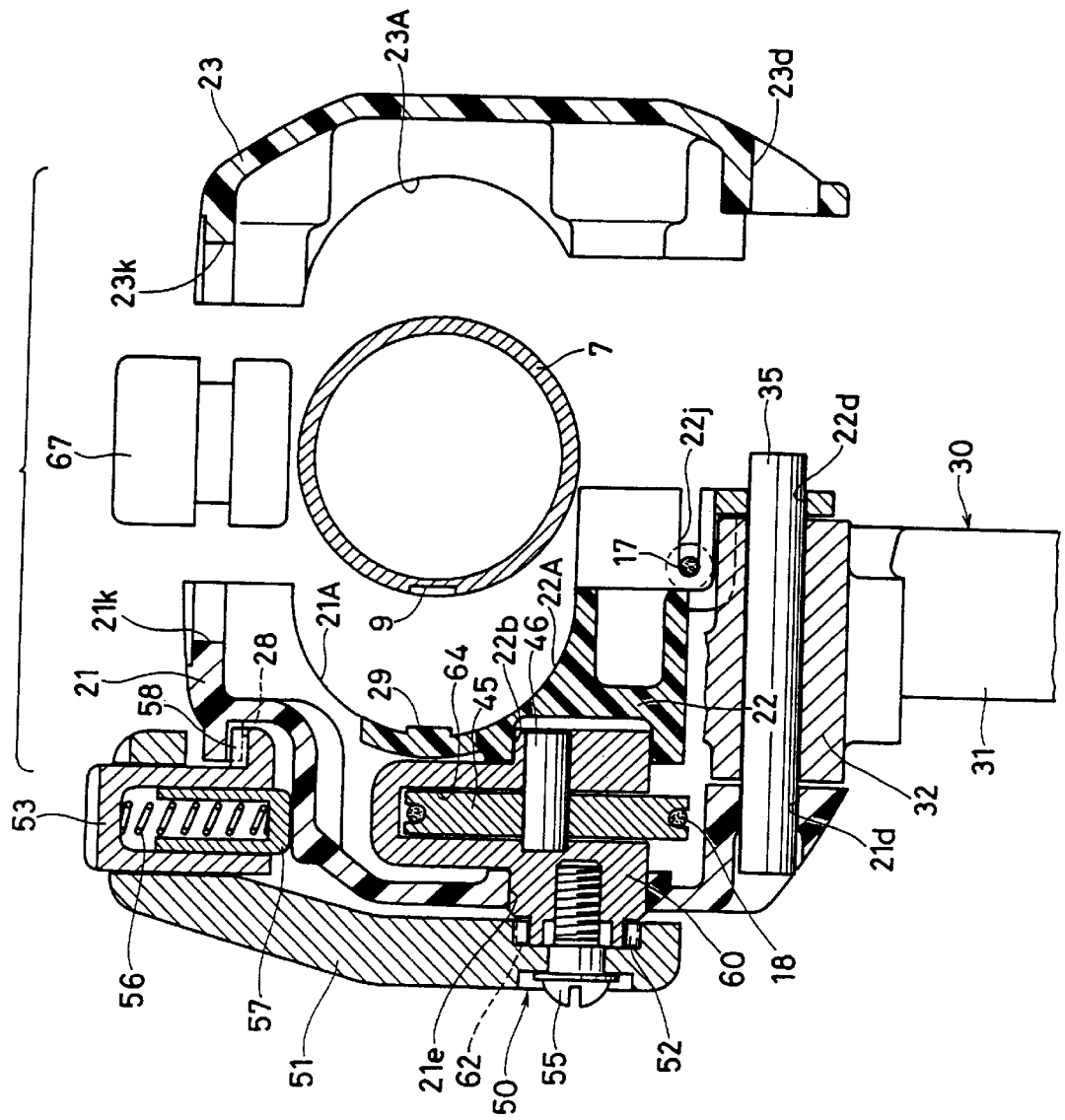
FIG. 11 is a cross-sectional view illustrating a state where a right side cover case, an intermediate cover case and a left side cover case of the hand lever apparatus shown in FIG. 6 are dismantled from the handle.

Even if the case member 20 constituted by the right cover case 21, the intermediate cover case 22 and the left cover case 23 is dismantled from the bar handle 7 and disintegrated, in other words, even before the hand lever apparatus 10 is assembled with the handle 7 or even at the occasion of maintenance service, the movable members such as the main lever 30, the pulling magnitude-magnifying mechanism 40, the pulley 45, the position-adjustment mechanism 50, etc. can be kept in an assembled state in association with only the right cover case 21 and the intermediate cover case 22 as shown in FIG. 11.

Due to this construction, it is possible with the hand lever apparatus 10 of this embodiment to more easily perform the assembling work and maintenance service as compared with the conventional hand lever apparatus of two-pieces divided type where the movable members can be hardly kept in an assembled state in association with the case member (one of the pair).

Furthermore, the bar handle 7 is provided with the concave portion 9, while the intermediate cover case 22 is provided with the locking protrusion 29 to be engaged with the aforementioned concave portion 9. Therefore, it is possible, when the case member 20 is externally fitted over the bar handle 7 by fitting the locking protrusion 29 in the concave portion 9, to prevent the case member 20 from being rotated around the bar handle 7 or from being moved in the longitudinal direction due to the effect of engagement between the locking protrusion 29 and the concave portion 9.

Therefore, it is possible to obtain a constantly stabilized manipulability without accompanying a dislocation of the distal tip of the throttle cable 17 so that the distance of pulling of the throttle cable 17 in relative to the magnitude of manipulating the main lever 30 and the position-adjustment mechanism 50 will become constant, thus making it possible to accurately control the opening degree of the throttle valve CV.

When the main lever 30 is manipulated to be rotated up to the set position in close to the rear grip portion 11 of the bar handle 7 in the hand lever apparatus 10 of this embodiment constructed as explained above, the throttle cable 17 is pulled up to a predetermined distance via the pulling magnitude-magnifying mechanism 40 employing the lever 41 and via the pulley 45 constituting the turning member thereby taking the looseness away.

In this case, the magnitude of pulling (displacement) of the cable 17 by the main lever 30 is magnified by the pulling magnitude-magnifying mechanism 40, so that the turning angle a of the main lever 30 which is required for pulling the cable 17 in a sufficient degree can be minimized as compared with that required in the conventional hand lever apparatus (see FIG. 2). Accordingly, the space for allowing the main lever 30 to rotate between the grip portion 11 of the bar handle 7 and the main lever 30 can be minimized, resulting in a miniaturization and lightening of the apparatus and hence the workability and operability of the hand lever apparatus 10 can be improved.

When the push button 53 mounted on the position-adjustment mechanism 50 is pushed so as to move the sub-lever 51 to a desired rearward position while keeping the main lever 30 maintained at the aforementioned set position, the pulley 45 is forced to move in the direction of pulling the throttle cable 17, and hence the throttle cable 17 is further pulled via the pulling magnitude-magnifying mechanism 40 and the pulley 45, thus moving the throttle valve CV from the minimum opening degree (the idling opening degree) to a desired opening degree thereby to control the opening degree.

In this case, since the throttle cable 17 is pulled by the pulley 45 while being wound around the pulley 45, the throttle cable 17 will be pulled twice as much distance as that of the moving distance of the pulley 45. As a result, the magnitude for manipulating the sub-lever 51 of the position-adjustment mechanism 50 which is required for adjusting the opening degree of the throttle valve CV, i.e. the moving distance of the pulley 45 can be minimized, thus further promoting the miniaturization and lightening of the apparatus.

In this case, even if the sub-lever 51 is leased, the sub-lever 51 can be kept as it is in an immobilized state at the previous manipulation position due to the engagement between the serrated movable gear 58 and the serrated fixed gear 28, so that the pre-adjusted opening degree (the set opening degree) of the throttle valve CV can be maintained. Because of this, a burden on the operator's fingers can be also reduced.

When any accident happens to occur under a condition where the opening degree of the throttle valve CV has been set at a desired degree so as to necessitate a prompt and prominent reduction of rotational speed of the engine 2, the main lever 30 is released thereby allowing the main lever 30 to be pulled in the reverse direction to return together with the lever 41 of the pulling magnitude-magnifying mechanism 40 to the original positions, since the throttle cable 17 is always energized in a direction to close the throttle valve CV. As a result, the throttle cable 17 is returned to the manipulation-free state, and the throttle valve CV is allowed to return to the idling opening degree, thus rendering the engine 2 to take an idling state.

In this case, when this hand lever apparatus 10 is applied to a working machine 1 whose rotational driving force is adapted to be transmitted via a centrifugal clutch to a working member 3 such as a cutting blade 13, the centrifugal clutch is turned into a cut-off condition, thus cutting the transmission of driving force to the working member 3 thereby making it possible to immediately stop the movement of the working member 3 such as the cutting blade 13.

When the main lever 30 is rotated again up to the set position in close to the grip portion 11 after the main lever 30 is once released as mentioned above, the looseness of the throttle cable 17 becomes zero and, since the sub-lever 51 provided in the position-adjustment mechanism 50 is kept remained in the previous operational position, the throttle valve CV is put back to the previous opening degree which has been set before the main lever 30 is released, thus making the re-adjustment of the sub-lever 51 unnecessary.

As explained above, according to the hand lever apparatus 10 of the present invention, the opening degree of throttle valve CV constituting a driven member can be controlled by the cable 17 and at the same time easily retained at a desired opening degree. Additionally, the throttle valve CV can be immediately put back to the minimum opening degree (the idling opening degree) thus ensuring a high operational safety, and at the same time it is possible to avoid the fingers from becoming tired in short time. Furthermore, when the throttle valve CV is desired to be put back to the previous opening degree which has been set before the throttle valve CV is returned into the idling opening degree, it can be achieved without requiring the re-adjustment of the sub-lever 51. Moreover, according to the hand lever apparatus 10 of the present invention, it is possible to effectively miniaturize and lighten the apparatus, and hence the workability and operability of the hand lever apparatus can be further improved.

While one embodiment of the present invention has been explained in details for the purpose of illustration in the foregoing, it will be understood that the construction of the device can be varied without departing from the spirit and scope of the present invention.

Figure 12:
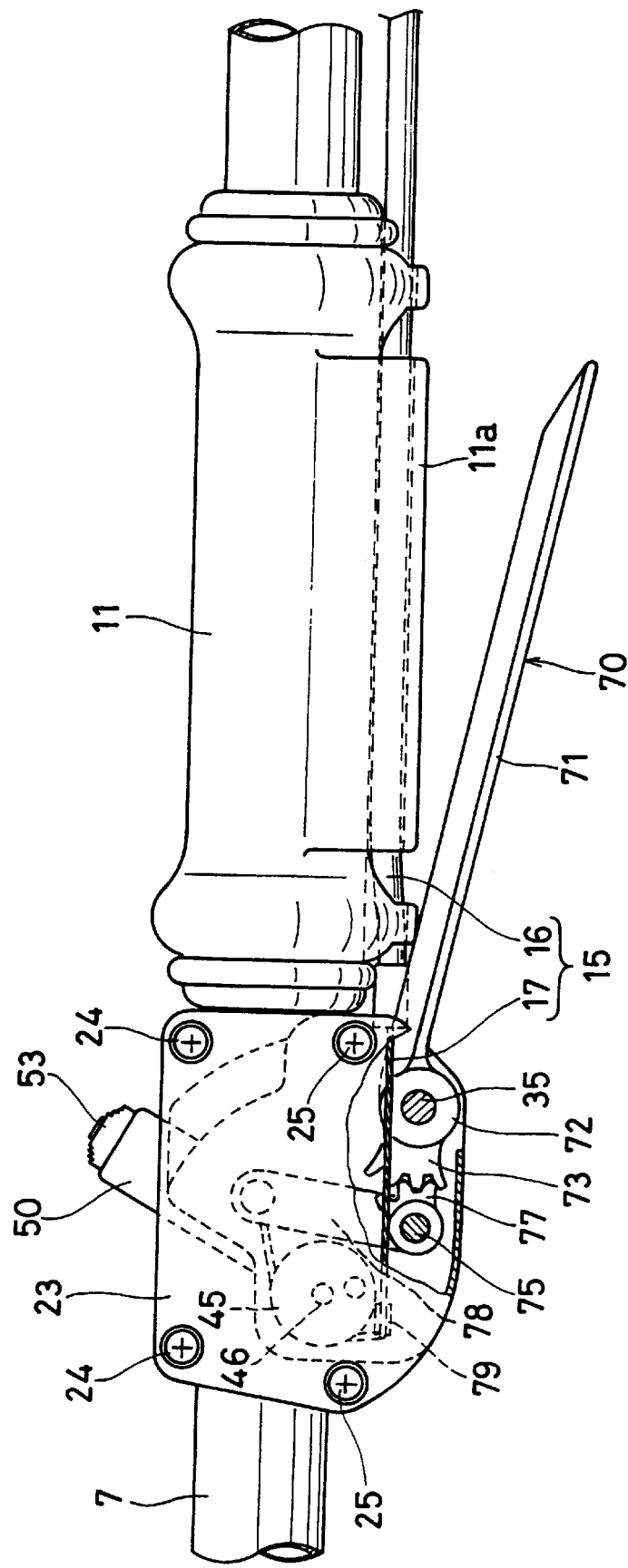
FIG. 12 is a partially sectioned left side view illustrating another example of the hand lever apparatus of the present invention.

For example, the pulling magnitude-magnifying mechanism is not limited to those having a lever 41 as explained above, but may be constructed as shown in FIG. 12. Namely, in this embodiment, the main lever 70 is provided with a manipulation portion 71, with a cylindrical portion 72 externally fitted around a supporting shaft 35 and with a first sector gear 73 having a larger diameter which is integrally formed on the cylindrical portion 72. The support shaft 35 has a first axis (unnumbered) about which the manipulation portion 71 is pivotal. On the other hand, a second sector gear 77 having a smaller diameter is rotatably fitted around a supporting shaft 75 so as to be engaged with the first sector gear 73. A distal end portion of the throttle cable 17 is connected with the distal end portion of a tension lever 78, so that the throttle cable 17 can be pulled by the tension lever 78 via a guide member 79 and the pulley 45 which is rotable about a second axis. In this case, the first sector gear 73, the second sector gear 77 and the tension lever 78 function to magnify the magnitude of pulling the throttle cable 17 by the main lever 70.

While the foregoing embodiments have been illustrated centering on the case where the hand lever apparatus of the present invention is applied to the internal combustion engine 2 for controlling the opening degree of the throttle valve CV, the hand lever apparatus of this invention is not confined to the aforementioned embodiments but is applicable to various kinds of devices other than for controlling the opening degree of the throttle valve CV.

Furthermore, the hand lever apparatus 10 may be mounted on a U-shaped handle other than the aforementioned bar handle.

As would be clear from the foregoing explanations, it is possible according to the hand lever apparatus of the present invention to control the opening degree of throttle valve constituting a driven member by making use of a cable and at the same time the opening degree of the throttle valve can be easily retained at a desired degree. Additionally, the throttle valve can be immediately put back to the minimum opening degree (the idling opening degree) thus ensuring a high operational safety, and at the same time it is possible to avoid the fingers from becoming tired in short time. Furthermore, when the throttle valve is desired to be put back to the previous opening degree which has been set before the throttle valve is returned into the idling opening degree, it can be achieved without requiring any re-adjustment of the valve. Moreover, according to the hand lever apparatus of the present invention, it is possible to effectively miniaturize and lighten the apparatus, and hence the workability and operability of the hand lever apparatus can be further improved.

What is claimed is:

1. A hand lever apparatus constructed and arranged for positioning in a mounted state on a working machine, and for controlling operation of the working machine, the working machine comprising a throttle valve and a control cable for controlling the throttle valve, the hand lever apparatus in the mounted state comprising:

a main lever rotatably mounted to a cover casing, said main lever having a finger manipulable portion and an extending portion;

a connecting cable having first and second ends, said first end being attached to said extending portion of said main lever;

a pulley around which said connecting cable is guided, said pulley having a rotational axis;

a magnitude-magnifying lever having a shorter arm portion, an opposed longer arm portion for attaching to an end of the control cable, and a shaft mounted to the cover casing, said shaft being disposed intermediate said shorter arm portion and said longer arm portion, said shorter arm portion being attached to said second end of said connecting cable, wherein manipulation of said main lever generates a pulling force for moving the control cable and thereby controlling the throttle valve.

2. The hand lever apparatus of claim 1, further comprising an adjustment member mounted to said cover casing, said adjustment member being operatively associated with said pulley to displace the rotational axis of said pulley between a plurality of axis displacement positions and thereby adjust the moving force applied to the control cable.

3. The hand lever apparatus of claim 2, wherein said adjustment member comprises a selectively movable tooth portion and a fixed tooth portion engageable with each other at a plurality of selected positions, each of said selected positions corresponding to a respective one of said axis displacement positions.

4. A hand lever apparatus constructed and arranged for positioning in a mounted state on a working machine and for controlling operation of the working machine, the working machine comprising a throttle valve movable between a minimum opening idling state and revolution-manipulation positions and a throttle cable for operatively connecting the throttle valve to said hand lever apparatus, the throttle cable having a distal end portion connected to the throttle valve, said hand lever apparatus in the mounted state comprising:

a main lever comprising a finger-manipulable portion; and a magnitude-magnifying mechanism comprising:
  a pivot pin;
  a lever member pivotal about said pivot pin, said lever member having a shorter arm portion and a longer arm portion for operative connection to the throttle cable, said shorter arm portion opposing said longer arm portion and being connected to said main lever by a connecting cable so that actuation of said finger-manipulable portion pivots said lever member about said pivot pin and causes said longer arm portion to move the throttle cable away from the throttle valve and open the throttle valve from the minimum-opening idling state;
  a pulley having a circumference and rotatable about an axis; and
  the connecting cable, which extends around a portion of said circumference of said pulley to connect said main lever to said shorter arm portion.

5. The hand lever apparatus of claim 4, wherein said connecting cable extends around a sufficient portion of the circumference of said rotatable pulley to reverse directions of said connecting cable.

6. The hand lever apparatus of claim 4, further comprising a cover casing, wherein said pivot pin is mounted to said cover casing.

7. The hand lever apparatus of claim 4, further comprising a position-adjust mechanism cooperatively associated with said pulley to cause translational movement of said axis of said pulley about a plurality of adjustment positions, each of the adjustment positions corresponding to a respective one of the revolution-manipulation positions, wherein each of the revolution-manipulation positions corresponds to a respective one of the rotational speeds.

8. The hand lever apparatus of claim 7, wherein said connecting cable extends around a sufficient portion of the circumference of said rotatable pulley to reverse directions of said connecting cable.

9. The hand lever apparatus of claim 7, further comprising a cover casing, wherein said pivot pin is mounted to said cover casing.

10. A hand lever apparatus constructed and arranged for positioning in a mounted state on a working machine and for controlling operation of the working machine, the working machine comprising a throttle valve movable between a minimum opening idling state and revolution-manipulation positions and a throttle cable for operatively connecting the throttle valve to said hand lever apparatus, the throttle cable having a distal end portion connected to the throttle valve, said hand lever apparatus in the mounted state comprising:

a main lever comprising a finger-manipulable portion; and a magnitude-magnifying mechanism comprising:
  a pivot pin;
  a lever member pivotal about said pivot pin, said lever member having a first arm portion and a second arm portion for operatively connecting to the throttle cable at a second-arm-portion connection position, said first arm portion opposing said second arm portion and being connected to said main lever by a connecting cable so that actuation of said finger-manipulable portion pivots said lever member about said pivot pin and causes said second arm portion to move the throttle cable away from the throttle valve and open the throttle valve from the minimum-opening idling state;
  a pulley having a circumference and rotatable about an axis; and
  the connecting cable, which extends around a portion of said circumference of said pulley to connect said main lever to said first arm portion at a first-arm-portion connection position, wherein a first distance defined between said first-arm-portion connection position and said pivot pin is smaller than second distance defined between said second-arm-portion connection position and said pivot pin.

11. The hand lever apparatus of claim 10, wherein said connecting cable extends around a sufficient portion of the circumference of said rotatable pulley to reverse directions of said connecting cable.

12. The hand lever apparatus of claim 10, further comprising a cover casing, wherein said pivot pin is mounted to said cover casing.

13. The hand lever apparatus of claim 10, further comprising a position-adjust mechanism cooperatively associated with said pulley to cause translational movement of said axis of said pulley about a plurality of adjustment positions, each of the adjustment positions corresponding to a respective one of the revolution-manipulation positions, wherein each of the revolution-manipulation positions corresponds to a respective one of the rotational speeds.

14. The hand lever apparatus of claim 13, wherein said connecting cable extends around a sufficient portion of the circumference of said rotatable pulley to reverse directions of said connecting cable.

15. The hand lever apparatus of claim 13, further comprising a cover casing, wherein said pivot pin is mounted to said cover casing.

\* \* \* \* \*